(12) United States Patent
Morioka

(10) Patent No.: US 6,479,616 B2
(45) Date of Patent: Nov. 12, 2002

(54) POLYCARBONATE RESIN, METHOD FOR THE MANUFACTURE THEREOF, AND ARTICLES FORMED THEREFROM

(75) Inventor: Masataka Morioka, Moka (JP)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/683,229

(22) Filed: Dec. 4, 2001

(65) Prior Publication Data

US 2002/0082380 A1 Jun. 27, 2002

(30) Foreign Application Priority Data

Dec. 26, 2000 (JP) .......................... 2000-395578

(51) Int. Cl.$^7$ .............................................. C08G 64/00
(52) U.S. Cl. ........................................ 528/196; 528/198
(58) Field of Search .................................. 528/196, 198

(56) References Cited

U.S. PATENT DOCUMENTS

| | | | | |
|---|---|---|---|---|
| 3,028,385 A | 4/1962 | Batzer et al. | ................ | 260/248 |
| 3,169,121 A | 2/1965 | Goldberg | .................... | 260/47 |
| 3,334,154 A | 8/1967 | Kim | ........................... | 260/860 |
| 4,001,124 A | 1/1977 | Hussey | ........................ | 252/12 |
| 4,001,184 A | 1/1977 | Scott | ......................... | 260/47 X |
| 4,131,576 A | 12/1978 | Iovine et al. | ........ | 260/17.4 GC |
| 4,238,569 A | 12/1980 | Lim et al. | ...................... | 521/52 |
| 4,238,596 A | 12/1980 | Quinn | .......................... | 528/179 |
| 4,238,597 A | 12/1980 | Markezich et al. | .......... | 528/179 |
| 4,286,083 A | 8/1981 | Kochanowski | .............. | 528/173 |
| 4,474,999 A | 10/1984 | Mark et al. | ................. | 568/720 |

FOREIGN PATENT DOCUMENTS

| | | |
|---|---|---|
| JP | 2-175723 | 3/1990 |
| JP | 2-124934 | 5/1990 |
| JP | 4-174368 | 6/1992 |

Primary Examiner—Terressa M. Boykin

(57) ABSTRACT

A method for manufacturing a modified polycarbonate resin, characterized in that melting and kneading are used to react an anthracene compound and a polycarbonate resin. The modified polycarbonate resin contains structural units that are attached to the main chain of the modified polycarbonate resin. The structural units are expressed by formula [I-1] or [I-2] as follows:

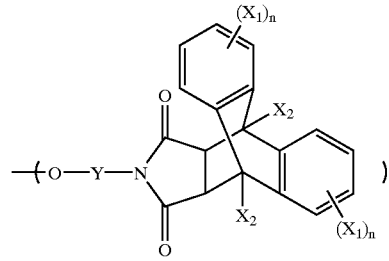

[I-1]

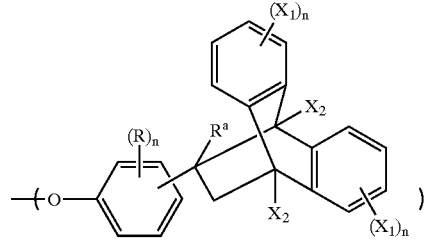

[I-2]

wherein Y is a $C_1$–$C_{20}$ bivalent hydrocarbon group; R is a $C_1$–$C_{20}$ hydrocarbon; $R^a$ is a hydrogen atom or a $C_1$–$C_{20}$ hydrocarbon; n is an integer from 0 to 4; X which may be the same or different, is a $C_1$–$C_{20}$ hydrocarbon group or a halogen atom; $X_2$, which may be the same or different, is a hydrogen atom, a $C_1$–$C_{20}$ hydrocarbon group, or a halogen atom; and a plurality of $X_1$s and $X_2$s may combine together to form a ring structure.

15 Claims, No Drawings

POLYCARBONATE RESIN, METHOD FOR THE MANUFACTURE THEREOF, AND ARTICLES FORMED THEREFROM

CROSS REFERENCE TO RELATED APPLICATIONS

The present application is based upon and claims priority to Japanese Application No. 2000-395578, with a filing date of Dec. 26, 2000, which is hereby incorporated by reference.

BACKGROUND OF INVENTION

This disclosure relates to modified polycarbonate resins, and in particular to the manufacture of modified polycarbonate resins having good moldability and high heat resistance.

Polycarbonate resins can yield molded articles with excellent transparency, heat resistance, and mechanical strength, and are therefore used in a variety of applications, such as in electrical/electronic components and in components for the interiors and exteriors of automobiles and other vehicles. Polycarbonate resins have a heat deformation temperature of about 130° C. when measured under a load of 18.6 kg; however, even higher heat resistance is sometimes required in applications involving automobile headlights and the like.

SUMMARY OF INVENTION

A method for manufacturing a modified polycarbonate resin comprises reacting an anthracene compound and a polycarbonate resin, wherein the resin is preferably in the melt phase, to produce a modified polycarbonate resin comprising structural units of formula [I-1] or [I-2] as follows:

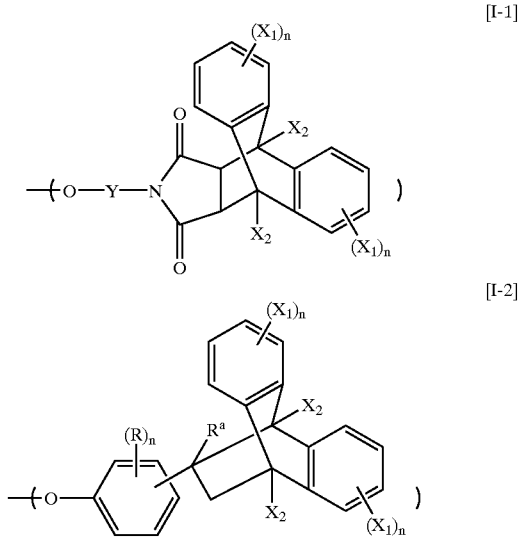

wherein Y is a $C_1$–$C_{20}$ bivalent hydrocarbon group; R is a $C_1$–$C_{20}$ hydrocarbon; $R^a$ is a hydrogen atom or a $C_1$–$C_{20}$ hydrocarbon; n is an integer from 0 to 4; each $X_1$, which may be the same or different, is a $C_1$–$C_{20}$ hydrocarbon group or a halogen atom; each $X_2$, which may be the same or different, is a hydrogen atom, a $C_1$–$C_{20}$ hydrocarbon group, or a halogen atom; and a plurality of $X_1$ and $X_2$ may combine together to form a ring structure.

The above-described and other features are exemplified by the following detailed description.

DETAILED DESCRIPTION

A transparent modified polycarbonate resin having excellent moldability and high heat resistance is advantageously formed by reacting a polycarbonate resin, preferably in the melt phase, with a reactive anthracene compound.

The polycarbonate resin comprises a main chain and structural units in which the structural units are copolymerization components and/or molecule ends, i.e., the structural units may be attached to along the chain or represent terminal groups to the main chain. Although a number of possible structural units exist, particularly useful structural units include [i-1] or [i-2]:

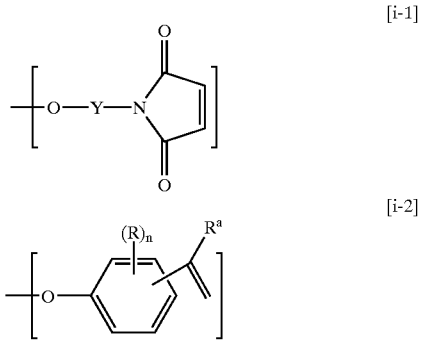

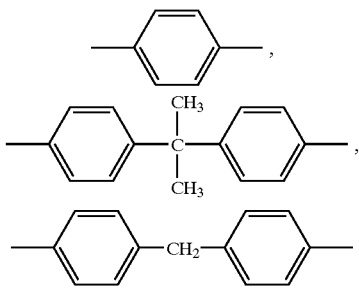

wherein Y is a $C_1$–$C_{20}$ bivalent hydrocarbon group such as methylene (—$CH_2$—), ethylene (—$C_2H_4$—), propylene (—$C_3H_6$—), or another aliphatic hydrocarbon group, an aromatic hydrocarbon group such as:

or an alicyclic hydrocarbon group; R is a $C_1$–$C_{20}$ hydrocarbon group such as methyl or ethyl; $R^a$ is a hydrogen atom or a $C_1$–$C_{20}$ hydrocarbon group such as methyl or ethyl; and n is an integer from 0 to 4. In formula [i-2], the R and the vinyl-containing group may attach to any position on the benzene ring (ortho, meta, or para).

The polycarbonate resin may contain either one or both of the structural units expressed by formulas [i-1] and [i-2].

The amount in which the structural units expressed by formulas [i-1] and [i-2] above are contained in the polycarbonate resin, although not subject to any particular limitations, can be less than or equal to 0.2 mol, with less than or equal to about 0.1 mol preferred. Also preferred is an amount of greater than or equal to 0.001 mol, with greater than or equal to about 0.002 mol more preferred, where mol is measured as mol per mole of the structural units derived from the aromatic dihydroxy compound the main chain.

The polycarbonate resin disclosed herein commonly has a glass transition temperature of about 148° C. It may be prepared in a solution comprising methyl chloride at a temperature of 25° C. The intrinsic viscosity of the polycarbonate in methyl chloride at 25° C. is not subject to any particular limitations and is appropriately selected with consideration for the intended application and moldability.

The intrinsic viscosity is commonly 0.26 dL/g or greater, preferably 0.30–0.98 dL/g, and more preferably 0.34–0.64 dL/g. Expressed as viscosity-average molecular weight, this value is commonly 10,000 or greater, preferably 12,000–50,000, and more preferably 14,000–30,000. A mixture of polycarbonate resins having different intrinsic viscosities can also be used.

One type of useful main chain is an aromatic homopolycarbonate wherein the repeating structural units are expressed by formula (1) below:

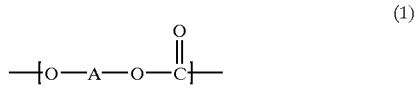
(1)

wherein A is a divalent group derived from an aromatic dihydroxy compound.

The aromatic homopolycarbonate can be obtained by reacting a carbonate precursor with an aromatic dihydroxy compound. A single aromatic dihydroxy compound may be used, or two or more such compounds may be used together. The aromatic dihydroxy compound may include monocyclic and polycyclic aromatic compounds having two hydroxy groups as its functional groups, with each of the hydroxy groups directly attached to a carbon atom of the aromatic ring. Specific examples of aromatic dihydroxy compounds include those compounds as expressed by formulas (2) and (3) below:

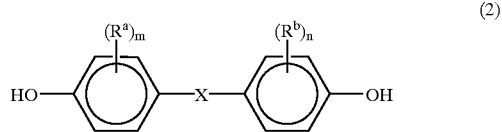
(2)

wherein $R^a$ and $R^{b,}$ which may be the same or different, are halogen atoms or monovalent hydrocarbon groups; m and n comprise integers from 0 to 4; X is

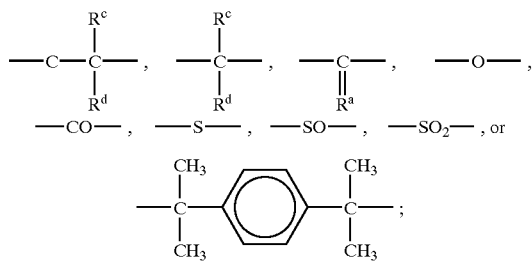

$R^c$ and $R^d$ are hydrogen atoms or monovalent hydrocarbon groups (the $R^c$ and $R^d$ may also form ring structures); and $R^e$ is a bivalent hydrocarbon group; and

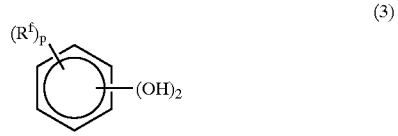
(3)

wherein $R^f$ is a $C_1$–$C_{10}$ hydrocarbon group, a halogenated hydrocarbon group in which one or more of the hydrocarbon groups may be substituted by halogen atoms, or a halogen atom; and p is an integer from 0 to 4.

Preferably, the aromatic dihydroxy compounds expressed by formula (2) include but are not limited to bis(4-hydroxyphenyl)methane, 1,1-bis(4-hydroxyphenyl) ethane, 2,2-bis(4-hydroxyphenyl)propane ("bisphenol A"), 2,2-bis (4-hydroxyphenyl) butane, 2,2-bis(4-hydroxyphenyl) octane, bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-3-bromophenyl) propane, 2,2-(4-hydroxy-3,5-dibromophenyl) propane, and other bis(hydroxyaryl)alkanes; 1,1-bis(4-hydroxyphenyl) cyclopentane, 1,1-(4-hydroxyphenyl)cyclohexane, and other bis(hydroxyaryl)cycloalkanes; 4,4'-dihydroxydiphenyl ether, 4,4'-dihydroxy-3,3'-dimethylphenyl ether, and other dihydroxyaryl ethers; 4,4'-dihydroxydiphenyl sulfide, 4,4'-dihydroxy-3,3'-dimethylphenyl sulfide, and other dihydroxydiaryl sulfides; 4,4'-dihydroxydiphenyl sulfoxide, 4,4'-dihydroxy-3,3'-dimethyldiphenyl sulfoxide, and other dihydroxydiaryl sulfoxides; and 4,4'-dihydroxydiphenyl sulfone, 4,4'-dihydroxy-3,3'-dimethyldiphenyl sulfone, and other dihydroxydiaryl sulfones. Of these, bisphenol A is particularly preferred.

The aromatic dihydroxy compounds expressed by formula (3) may also be used in addition to the aromaic dihdyroxy compounds expressed by formula (2) above. Dihydroxy compounds represented by formula (3) include but are not limited to resorcin; 3-methylresorcin, 3-ethylresorcin, 3-propylresorcin, 3-butylresorcin, 3-t-butylresorcin, 3-phenylresorcin, 3-cumylresorcin, 2,3,4,6-tetrafluororesorcin, 2,3,4,6-tetrabromoresorcin, and other substituted resorcins; catechol; hydroquinone; and substituted hydroquinones such as 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,3,5,6-tetramethylhydroquinone, 2,3,5,6-tetra-t-butylhydroquinone, 2,3,5,6-tetrafluorohydroquinone, and 2,3,5,6-tetrabromohydroquinone.

Also useful as an aromatic dihydroxy compound is 2,2,2',2'-tetrahydro-3,3,3',3'-tetramethyl-1,1'-spirobi-[1 H-indene]-7,7'-diol expressed by formula (4).

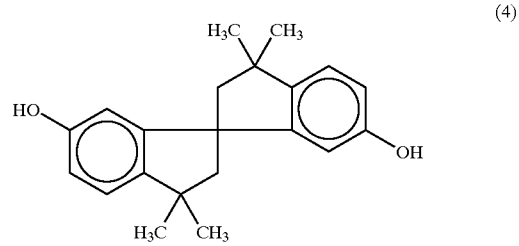
(4)

The main chain may be comprised of a linear or branched polycarbonate. A blend of linear and branched polycarbonates may also be used. A branched polycarbonate may be obtained by reacting a polyfunctional aromatic compound with an aromatic dihydroxy compound and a carbonate precursor. Typical examples of such polyfunctional aromatic compounds include those disclosed in U.S. Pat. Nos. 3,028,385; 3,334,154; 4,001,124; and 4,131,576. Examples include, but are not limited to, 1,1,1-tris(4-hydroxyphenyl) ethane, 2,2',2"-tris(4-hydroxyphenyl) diisopropylbenzene, α-methyl-α, α', α'-tris(4-hydroxyphenyl)-1,4-diethylbenzene, α, α', α"-tris(4-hydroxyphenyl)-1,3,5-triisopropylbenzene, fluoroglycine, 4,6-dimethyl-2,4,6-tri (4-hydroxyphenyl)-pentane-2,1,3,5-tri(4-hydroxyphenyl) benzene, 2,2-bis-[4,4-(4,4'-dihydroxyphenyl)-cyclohexyl]-propane, trimellitic acid, 1,3,5-benzenetricarboxylic acid, pyromellitic acid, and the like. Of these, 1,1,1-tris(4-hydroxyphenyl)ethane, α, α', α"-tris(4-hydroxyphenyl)-1,3,5-triisopropylbenzene, and the like are particularly preferred.

Another useful type of polycarbonate as the main chain may comprise a copolyester component having the structural units expressed by formula (6) below in addition to the structural units expressed by formula (1) above:

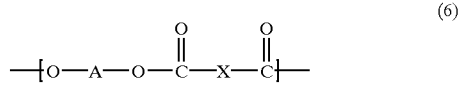
(6)

wherein A is a bivalent group derived from an aromatic dihydroxy compound as described above, and X is a bivalent hydrocarbon group derived from an aliphatic dicarboxylic acid. The structural units expressed by formula (6) above for the copolyester carbonate are present in an amount of 2–30 mol %, preferably 5–25 mol %, and ideally 7–20 mol %, in relation to the total amount of structural units expressed by formulas (1) and (6). Such a copolyester carbonate can be obtained by reacting a bivalent fatty acid compound and a carbonate precursor with the aromatic dihydroxy compound.

Examples of bivalent fatty acid compounds include bivalent fatty acids, esters thereof, acid halides, salts, and other derivatives. The bivalent fatty acids may, for example, be $C_8$–$C_{20}$, and preferably $C_{10}$–$C_{12}$, aliphatic dicarboxylic acids. These bivalent fatty acids or derivatives may be straight, branched, or cyclic. The aliphatic dicarboxylic acids should preferably be α, ω-dicarboxylic acids. Specific examples include sebacic acid (decanedioic acid), dodecanedioic acid, tetradecanedioic acid, octadecanedioic acid, eicosanedioic acid, and other straight saturated aliphatic dicarboxylic acids, of which sebacic acid and dodecanedioic acid are particularly preferred. Examples of suitable derivatives include acid halides such acid chlorides, and diaromatic esters such as diphenyl esters. The carbon number of the ester moiety of the esters is excluded from the carbon number of the aforementioned acids. The aforementioned bivalent fatty acids or derivatives may be used singly or as combinations of two or more components.

The structural units expressed by formula [i-1] and [i-2] above are introduced as the terminal groups or copolymerization components of such main-chain polycarbonates. Such polycarbonate resins can be obtained by ensuring that the compounds expressed by formula [ii-1] or [ii-2] below are present when the polycarbonate resin is produced by the polycondensation of the aforementioned aromatic dihydroxy compound and carbonate component precursor:

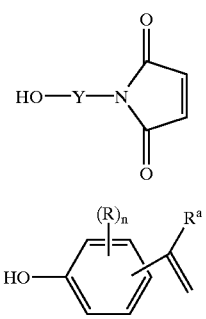

wherein Y, R, and $R^a$ are as defined above.

Compounds expressed by formula [ii-1] include, but are not limited to N-(hydroxymethyl)maleimide, N-(2-hydroxyethyl)maleimide, N-(p-hydroxyphenyl) maleimide, N-(6-hydroxyphenyl)maleimide, and 2-(4-hydroxyphenyl)-2'-(4'-maleimide phenyl)propane.

Compounds expressed by formula [ii-2] include, but are not limited to, p-hydroxystyrene, m-hydroxystyrene, o-hydroxystyrene, m-isopropenylphenol, and p-isopropenylphenol.

The content of compounds expressed by formula [ii-1] or [ii-2] can be less than or equal to about 0.2 mol, with less than or equal to about 0.25 mol preferred, and less than or equal to about 0.1 mol more preferred. Also preferred is a content of greater than or equal to about 0.001 mol, with greater than or equal to about 0.0015 more preferred, and greater than or equal to about 0.002 especially desired. Mol is measured as mol per mole of the aromatic dihydroxy compound.

The polycarbonate resin may be produced by commonly known manufacturing methods as described in, for example, JP (Kokai) 2-175723 and 2-124934, as well as in U.S. Pat. Nos. 4,286,083; 4,001,184; 4,238,569; 4,238,597; and 4,474,999.

In an exemplary embodiment, the polycarbonate resin can be synthesized by a fusion method. Here the polycarbonate resin is synthesized by inducing ester interchange in the molten state between an aromatic dihydroxy compound, a carbonate precursor (such as a carbonic acid diester), a compound expressed by formula [ii-1] or [ii-2], and an optional bivalent fatty acid component.

Suitable carbonate precursors include, but are not limited to, carbonic acid diesters including diphenyl carbonate, bis(chlorophenyl) carbonate, bis(2,4-dichlorophenyl) carbonate, bis(2,4,6-trichlorophenyl) carbonate, bis(2-cyanophenyl) carbonate, bis(o-nitrophenyl) carbonate, ditolyl carbonate, m-cresyl carbonate, dinaphthyl carbonate, bis(diphenyl) carbonate, diethyl carbonate, dimethyl carbonate, dibutyl carbonate, dicyclohexyl carbonate, or a combination of the aforementioned, wherein, diphenyl carbonate is particularly preferred.

Polycondensation of the carbonic acid diester, the compound expressed by formula [ii-1] or [ii-2] above, the aromatic dihydroxy compound, and the optional bivalent fatty acid component results in a polycarbonate resin into which the structural units expressed by formula [i-1] and [i-2] above are introduced into the polycarbonate main chain (copolyester carbonate main chain when a bivalent fatty acid component is contained). The amount of carbonic acid diester is preferably about 0.95–1.30 mol, and more preferably about 1.01–1.20 mol, per mole of the combined amount of aromatic dihydroxy compounds.

A fusion polycondensation catalyst may also be used, such as that disclosed by Applicants in JP (Kokai) 4-175368. Alternatively, the fusion polycondensation catalyst may comprise alkali metal compounds and/or alkaline-earth metal compounds ("alkaline (earth) metal compounds"), basic compounds, boric acid or borate ester, or combination of the aforementioned.

The alkaline (earth) metal compounds may comprise, but are not limited to, organic acid salts, inorganic acid salts, oxides, hydroxides, hydrides, alcoholates, and other compounds of alkali metal compounds or alkaline-earth metal. The alkaline (earth) metal compounds are preferably contained in amounts ranging from $1\times10^{-8}$ to $1\times10^{-3}$ mol, preferably $1\times10^{-7}$ to $2\times10^{-6}$ mol, and ideally $1\times10^{-7}$ to $8\times10^{-7}$ mol, per mole of the aromatic dihydroxy compound, such as, bisphenol A, during the fusion polycondensation reaction. When an alkaline (earth) metal compound is added in advance to the aromatic dihydroxy compound (starting material for the fusion polycondensation reaction), the amount in which the alkaline (earth) metal compound is present during the fusion polycondensation reaction is preferably controlled such that the amount in which this compound is added per mole of the aromatic dihydroxy compound remains within the aforementioned range.

Alkali metal compounds include, but are not limited to, sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium stearate, potassium stearate, lithium stearate, sodium borohydride, lithium borohydride, sodium phenyl boron, sodium benzoate, potassium benzoate, lithium benzoate, disodium hydrogen phosphate, dipotassium hydrogen phosphate, dilithium hydrogen phosphate, disodium (dipotassium, dilithium) salts of bisphenol A, and sodium (potassium, lithium) salts of phenols.

Alkaline-earth metal compounds include, but are not limited to, potassium hydroxide, barium hydroxide, magnesium hydroxide, strontium hydroxide, potassium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate, and combinations of the aforementioned.

The basic compounds may comprise a nitrogen-containing basic compound readily decomposable or volatilizable at high temperatures. Such compounds include, but are not limited to, tetramethylammonium hydroxide ($Me_4NOH$), tetraethylammonium hydroxide ($Et_4NOH$), tetrabutylammonium hydroxide ($Bu_4NOH$), trimethylbenzylammonium hydroxide ($\phi$—$CH_2$ $(Me)_3$ NOH), and other ammonium hydroxides having alkyl, aryl, and aralkyl groups; trimethylamine, triethylamine, dimethylbenzylamine, triphenylamine, and other tertiary amines; secondary amines expressed as $R_2$ NH (where R is an alkyl group such as methyl or ethyl; an aryl group such as phenyl or tolyl; or the like); primary amines expressed as $RNH_2$ (where R is the same as above); 4-dimethylaminopyridine, 4-diethylaminopyridine, 4-pyrrolidinopyridine, and other pyridines; 2-methylimidazole, 2-phenylimidazole, and other imidazoles; and ammonia, tetramethylammonium borohydride ($Me_4$ $NBH_4$), tetrabutylammonium borohydride ($Bu_4$ $NBH_4$), tetrabutylammonium tetraphenyl borate ($Bu_4$ $NBPh_4$), tetramethylammonium tetraphenyl borate ($Me_4NBPh_4$), and other basic salts. Of these, the tetraalkylammonium hydroxides are particularly preferred. The basic compound may be used in amounts ranging from about $1\times10^{-6}$ to $1\times10^{-1}$ mol, and preferably $1\times10^{-5}$ to $1\times10^{-2}$ mol, per mole of the aromatic dihydroxy compound, such as bisphenol A.

The boric acid compound may include boric acid and borate esters. The borate esters comprise those esters expressed by the following general formula:

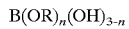

$B(OR)_n(OH)_{3-n}$ wherein R is methyl, ethyl, or another alkyl, phenyl or another aryl, or the like; and n includes the integers 1, 2, and 3. Borate esters composed of the aforementioned general formula include, but are not limited to, trimethyl borate, triethyl borate, tributyl borate, trihexyl borate, triheptyl borate, triphenyl borate, tritolyl borate, and trinaphthyl borate. Boric acid or borate ester may be used in an amount from about $1\times10^{-8}$ to $1\times10^{-1}$ mol, preferably from about $1\times10^{-7}$ to $1\times10^{-2}$ mol, and ideally from about $1\times10^{-6}$ to $1\times10^{-4}$ mol, per mole of the aromatic dihydroxy compound, such as bisphenol A.

When alkaline (earth) metal compounds and basic compounds are used together, or when alkaline (earth) metal compounds, basic compounds, and boric acid or borate ester are used together, a mixture of catalyst components may be added to a molten mixture of an aromatic dihydroxy compound, such as bisphenol A, and a carbonic acid diester, or the components may be added separately to the molten mixture of the aromatic dihydroxy compound and a carbonic acid diester.

Using a combination of alkaline (earth) metal compounds and basic compounds in the above amounts to obtain a catalyst is preferred because such use allows the polycondensation reaction to proceed at an adequate velocity, and results in a high-molecular-weight polycarbonate having a high polymerization activity.

In a secondary exemplary embodiment, the polycarbonate resin can be synthesized by an interface method. Here the synthesis reaction is carried out in a solution between an aromatic dihydroxy compound, a carbonate precursor, a compound expressed by formula [ii-1] or [ii-2] above, and an optional bivalent fatty acid component.

Carbonate precursors include, but are not limited to, carbonyl halides, diaryl carbonates, and bishaloformates. Suitable carbonyl halides include, but are not limited to, carbonyl bromide, carbonyl chloride, and mixtures thereof. Suitable diaryl carbonates include, but are not limited to, diphenyl carbonate, ditolyl carbonate, bis (chlorophenyl) carbonate, m-cresyl carbonate, dinaphthyl carbonate, and bis(diphenyl) carbonate. Suitable bishaloformates include, but are not limited to, bischloroformates and bisbromoformates of 2,2-bis(4-hydroxyphenyl)propane, 2,2-bis(4-hydroxy-3,5-dichlorophenyl)propane, hydroquinone, and other aromatic dihydroxy compounds; and bischloroformates and bisbromoformates of ethylene glycol and other glycols. Although any of the aforementioned carbonate precursors may be used, carbonyl chloride is particularly preferred.

With the interface method, the modified polycarbonate resin can be produced by the method described, for example, in U.S. Pat. Nos. 4,238,596 and 4,238,597. Specifically, an acid halide may be formed before the ester-forming groups in a carbonate precursor (for example, carbonyl chloride) are reacted with an aromatic dihydroxy compound and a compound expressed by formula [ii-1] or [ii-2] above; a reaction involving carbonyl chloride or another carbonate is then performed. A pyridine solvent and a dicarboxylic acid may also be used according to a basic solution technique (see U.S. Pat. No. 3,169,121).

However, an improved Kochanowsky technique (U.S. Pat. No. 4,286,083) is the preferred production method. According to this technique, a lower diacid such as adipic acid is first converted to a salt (preferably an alkali metal salt such as a sodium salt), and the product is then added to a reaction vessel containing an aromatic dihydroxy compound and a compound expressed by formula (ii-1) or (ii-2) above. The aqueous phase is kept at an alkaline pH level (preferably at a pH of about 8–9) during the carbonyl chloride reaction, and then raised to a pH of about 10–11 when at least about 5% of the reaction with carbonyl chloride remains to be performed.

The interface method should preferably be performed using a catalyst system when a bischloroformate technique is involved, for example. The principal catalyst system may be an amine such as a tertiary amine, amidine, or guanidine. Tertiary amines are commonly used, of which trialkylamines such as triethylamine are particularly preferred.

In addition to the compounds used in the fusion method and the interface method, end blockers may also be added to the reaction when preparing the polycarbonate resin in order to adjust the molecular weight of the compound. Suitable end blockers may comprise phenol, p-t-butylphenol, isononylphenol, isooctylphenol, m- or p-cumylphenol (preferably p-cumylphenol), and chromanyl components.

The anthracene compound may be may be expressed by formula (A) below:

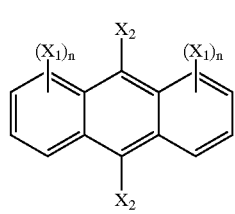

(A)

wherein each $X_1$ may be the same or different, and is a $C_1$–$C_{20}$ hydrocarbon group or a halogen atom; each $X_2$ which may be the same or different, is a hydrogen atom, a $C_1$–$C_{20}$ hydrocarbon group, or a halogen atom; and a plurality of $X_1$s and $X_2$s may combine together to form a ring structure.

For example, the anthracene compound includes, but is not limited to, anthracene, 2-methylanthracene, 9-methylanthracene, 9-hydroxymethylanthracene, 9-chloroanthracene, 9-anthracenecarboxylic acid, or the like.

The modified polycarbonate resin is formed in a reaction between the anthracene compound and the polycarbonate resin. As used herein, the modified polycarbonate resin is the resin produced by reacting the polycarbonate resin with the anthracene. Such reaction is advantageously obtained by kneading the anthracene compound with the polycarbonate resin as disclosed above, preferably with the polycarbonate resin in the melt phase.

The anthracene compound may be used in an amount of less than or equal to about 3 mol, with less than or equal to about 1.5 mol preferred, and less than or equal to about 1.2 mol more preferred. Also preferred is an amount of greater than or equal to about 0.2 mol, with greater than or equal to about 0.5 more preferred, and greater than or equal to about 0.8 especially desired, where mol is mol per mole of the structural units expressed by formula [i-1] and [i-2].

The melting and kneading temperature, while not subject to any particular limitations, can be less than or equal to 315° C., with less than or equal to about 310° C. preferred, and less than or equal to about 305° C. more preferred. Also preferred is a temperature of greater than or equal to about 285° C., greater than or equal to about 290° C. more preferred, and greater than or equal to about 295° C. especially desired.

The kneader used to achieve such melting and kneading is not subject to any particular limitations and may be a twin-screw extruder, single-screw extruder, autoclave, Plastomill, or the like. Of these, extrusion-type kneaders capable of exerting pressure or shear force on the molten and kneaded material are particularly preferred.

The reaction expressed by (B) is believed to occur when an anthracene compound and a polycarbonate resin containing structural units expressed by [i-1] and/or [i-2] are reacted by melting and kneading. However, the disclosure is not limited to this reaction

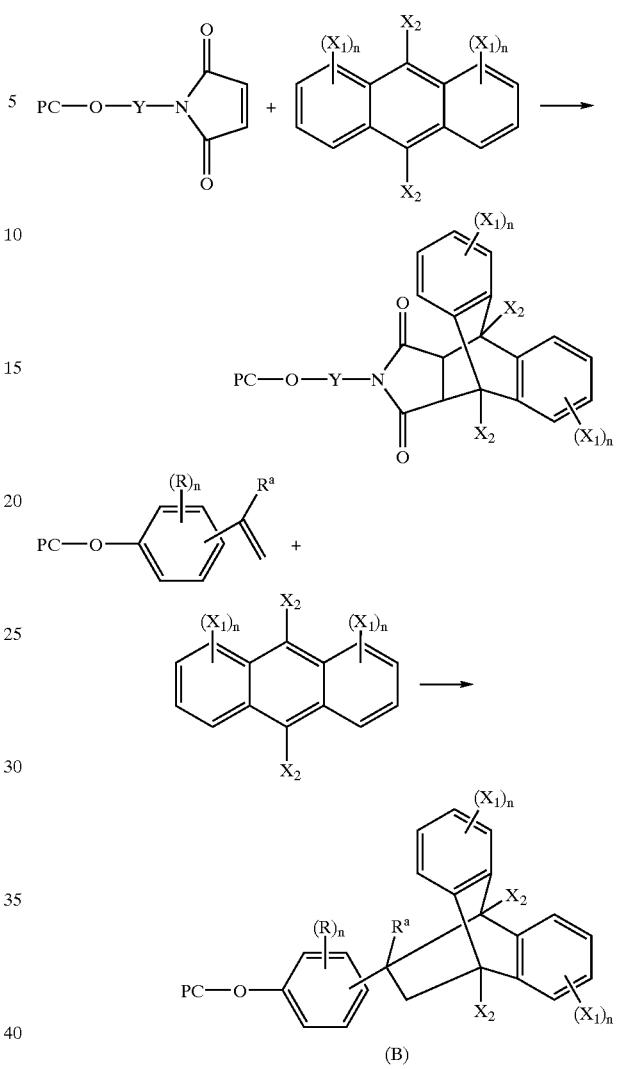

(B)

wherein Y, R, $X_1$, $X_2$, and n are the same as above, and PC is a polycarbonate main chain.

Reaction completion can be confirmed by the absence of a free anthracene compound (one that is left behind without being reacted) in the reacted modified polycarbonate resin.

The modified polycarbonate resin formed according to the above disclosure has the structural units expressed by formula [I-1] or [I-2] below

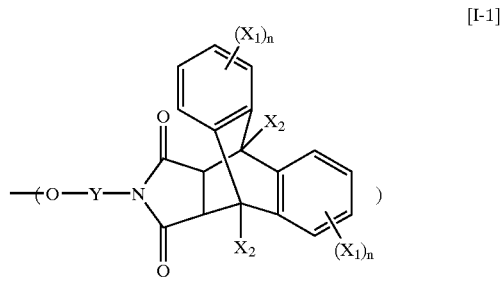

[I-1]

-continued

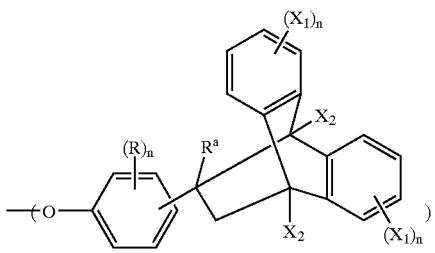
[I-2]

wherein Y, R, $R^a$, n, X, and X are the same as described above.

The amount of the structural units expressed by formula [I-1] or [I-2] may be less than or equal to about 0.2 mol, with less than or equal to about 0.15 mol preferred, and less than or equal to about 0.1 mol more preferred. Also preferred is greater than or equal to about 0.001 mol, with greater than or equal to about 0.015 mol more preferred, and greater than or equal to about 0.002 especially desired.

Other resins, additives (elastomers, flame retardants, flame retardant additives, stabilizers, UV absorbers, plasticizers, lubricants, and the like), pigments, fillers, and other components may also be appropriately added as desired to the modified polycarbonate resin obtained according to the present disclosure.

The disclosure is further illustrated by the following non-limiting examples.

EXAMPLE 1

Formation of a Modified Polycarbonate Resin

The starting material for the formation of the modified polycarbonate resin is Bisphenol A polycarbonate (Lexan®, manufactured by GE Plastics Japan); intrinsic viscosity: 0.46 dL/g, as measured in methyl chloride at 25° C.

Double bonds positioned at the terminal moieties of the polycarbonate, are obtained according to the following method. 2.28 kg (10.0 mol) of 2,2-Bis(4-hydroxyphenyl) propane ("bisphenol A"), 75.6 g (0.4 mol) of N-(p-hydroxyphenyl)-maleimide, and 14.0 mL of triethylamine are vigorously stirred at room temperature after being added to a mixture of 6 L deionized water and 7 L methylene chloride. An aqueous solution of sodium hydroxide (50%) is then added to the mix. Carbonyl chloride is then blown into the mixed solution for 20 minutes at a rate of 60 g/min while the pH of the solution is kept at 10. After the addition of carbonyl chloride has been completed, the system is stirred for 5 minutes, and the aqueous phase and the methylene chloride solution are separated. The methylene chloride solution is washed first with water, then with 2% hydrochloric acid, and then again with water; the solvent is removed; and the remaining, maleimide-blocked polycarbonate, product is dried overnight at 100° C.

Absorption attributed to $v_{C=O}$ was found to occur at 1704 $cm^{-1}$ when the resulting product was subjected to IR analysis.

$^1$H-NMR measurements also revealed the presence of a peak (which corresponded to hydrogen atoms attached to the double-bond carbons of maleimide) at δ 6.85 ppm. According to molecular weight measurements by GPC, the maleimide-blocked polycarbonate has a number-average molecular weight of 11,300 and a weight-average molecular weight of 28,100.

Anthracene (1.96 g) is added to 72 g of the maleimide-blocked polycarbonate thus obtained, and the resulting mixture is introduced into a Plastomill preheated to 300° C. The mixture is melted and kneaded for 5 minutes at 100 reductions per minute (rpm) and 300° C., yielding a polycarbonate reaction product. The glass transition temperature (measured by differential scanning calorimetry) of the resulting modified polycarbonate resin was 158° C., which is 10° C. higher than the glass transition temperature (148° C.) of a conventional polycarbonate.

A modified polycarbonate resin obtained according to the above disclosure exhibits exceptional physical characteristics, such as high transparency and mechanical strength. In addition, the modified polycarbonate resin exhibits excellent heat resistance. For example, the glass transition temperature of the resulting modified polycarbonate resin exceeds that of conventional polycarbonates by about 5 –20° C., and preferably by about 10–15° C. It can therefore be used to manufacture plastic components of electronic/electrical equipment, consumer electronics and appliances, and OA equipment. It may also be ideally suited as a molding material for headlights, transparent see-through housings, and the like, as it may facilely be molded into any shape by injection molding, extrusion molding, blow bolding, or any other molding method. Various known additives may optionally be added when a molding is manufactured using the modified polycarbonate resin.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A modified polycarbonate resin, comprising a polycarbonate main chain and structural units expressed by formula [I-1] or [I-2] below:

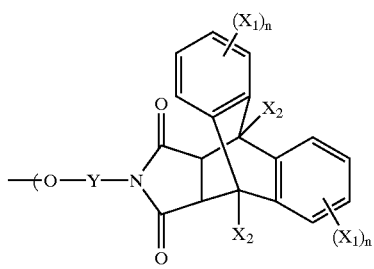
[I-1]

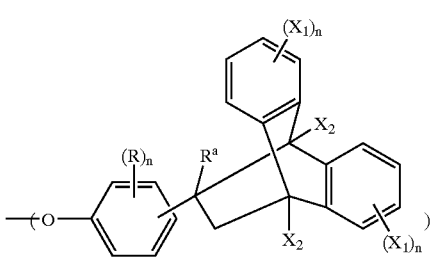
[I-2]

wherein
Y is a $C_1-C_{20}$ bivalent hydrocarbon group;

R is a $C_1$–$C_{20}$ hydrocarbon;

$R^a$ is a hydrogen atom or a $C_1$–$C_{20}$ hydrocarbon;

n is an integer from 0 to 4;

each $X_1$, which may be the same or different, is a $C_1$–$C_{20}$ hydrocarbon group or a halogen atom;

each $X_2$, which may be the same or different, is a hydrogen atom, a $C_1$–$C_{20}$ hydrocarbon group, or a halogen atom; or a plurality of $X_1$'s and $X_2$'s may combine together to form a ring structure.

2. The modified polycarbonate resin of claim 1, wherein said structural units expressed by formula [I-1] or [I-2] are present in an amount of about 0.001 mol –0.2 mol.

3. A method for the manufacture of the modified polycarbonate resin of claim 1, comprising reacting a polycarbonate resin and an anthracene compound of formula (A):

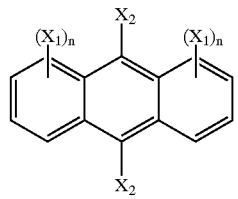

(A)

wherein each $X_1$ may be the same or different, and is a $C_1$–$C_{20}$ hydrocarbon group or a halogen atom; each $X_2$, which may be the same or different, is a hydrogen atom, a $C_1$–$C_{20}$ hydrocarbon group, or a halogen atom; and a plurality of $X_1$s and $X_2$s may combine together to form a ring structure.

4. The method of claim 3, wherein said polycarbonate resin is in a melt phase.

5. The method of claim 3, wherein said polycarbonate resin comprises a main chain comprising an aromatic polycarbonate; and structural units including one or a combination of the following formulas [i-1] and [i-2]:

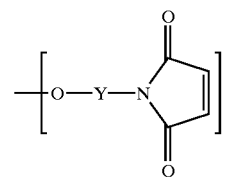

[i-1]

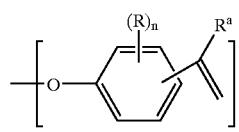

[i-2]

wherein Y is a $C_1$–$C_{20}$ bivalent hydrocarbon group; R is a $C_1$–$C_{20}$ hydrocarbon; $R^a$ is a hydrogen atom or a $C_1$–$C_{20}$ hydrocarbon; and n is an integer from 0 to 4.

6. The method of claim 3, wherein said polycarbonate resin is formed by reaction of a carbonate precursor with an aromatic dihydroxy compound expressed by formula (2):

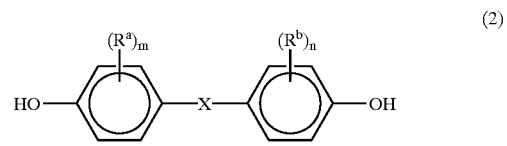

(2)

wherein $R^a$ and $R^b$, which may be the same or different, are halogen atoms or monovalent hydrocarbon groups, m and n comprise integers from 0 to 4, X is

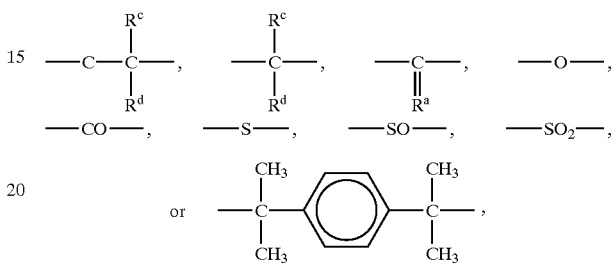

$R^c$ and $R^d$ are hydrogen atoms or monovalent hydrocarbon groups, the $R^c$ and $R^d$ may form ring structures, $R^e$ is a bivalent hydrocarbon group; and optionally a dihydroxy compound expressed by formula (3):

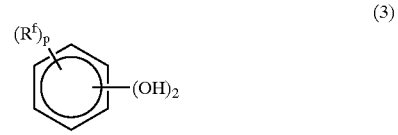

(3)

wherein $R^f$ is a $C_1$–$C_{10}$ hydrocarbon group, a halogenated hydrocarbon group in which one or more of the hydrocarbon groups may be substituted by halogen atoms, or a halogen atom and p is an integer from 0 to 4.

7. The method of claim 6, wherein polycarbonate resin comprises about 0.001 mol–0.2 mol of said structural units wherein mol is mol per mole of said structural units derived from said aromatic dihydroxy compound.

8. The method of claim 6, wherein said aromatic dihydroxy comprises bisphenol A.

9. The method of claim 6, wherein said reaction further comprises an aromatic dihydroxy compound is a compound expressed by formula (4).

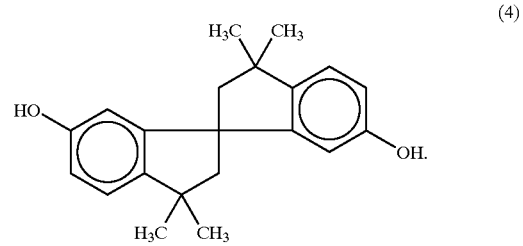

(4)

10. The method of claim 5, wherein said main chain is an aromatic homopolycarbonate having repeating structural units shown by formula (1):

(1)

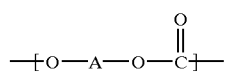

wherein A is a divalent group derived from an aromatic dihydroxy compound.

11. The method of claim 5, wherein said main chain comprises a copolyester component having structural units shown by formula (6):

(6)

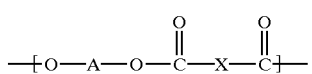

wherein A is a bivalent group derived from an aromatic dihydroxy compound, and X is a bivalent hydrocarbon group derived from an aliphatic dicarboxylic acid.

12. The method of claim 11, wherein said copolyester component includes 2–30 mol % of said structural units of said formula (6) in relation to the total amount of structural units expressed by said formulas (1) and (6).

13. The method of claim 3, wherein said polycarbonate resin is formed by reacting with said main chain, individually or in combination, compounds formulas [ii-1] and [ii-2]:

[ii-1]

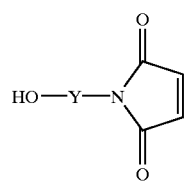

[ii-2]

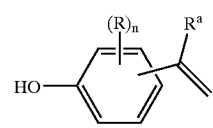

wherein Y is a $C_1$–$C_{20}$ bivalent hydrocarbon group; R is a $C_1$–$C_{20}$ hydrocarbon; $R^a$ is a hydrogen atom or a $C_1$–$C_{20}$ hydrocarbon; and n is an integer from 0 to 4.

14. The method of claim 3, wherein said anthracene compound includes anthracene, 2-methylanthracene, 9-methylanthracene, 9-hydroxymethylanthracene, 9-chloroanthracene, 9-anthracenecarboxylic acid, and a combination of the foregoing.

15. A molded article comprising the modified polycarbonate resin of claim 1.

\* \* \* \* \*